Figure 1:
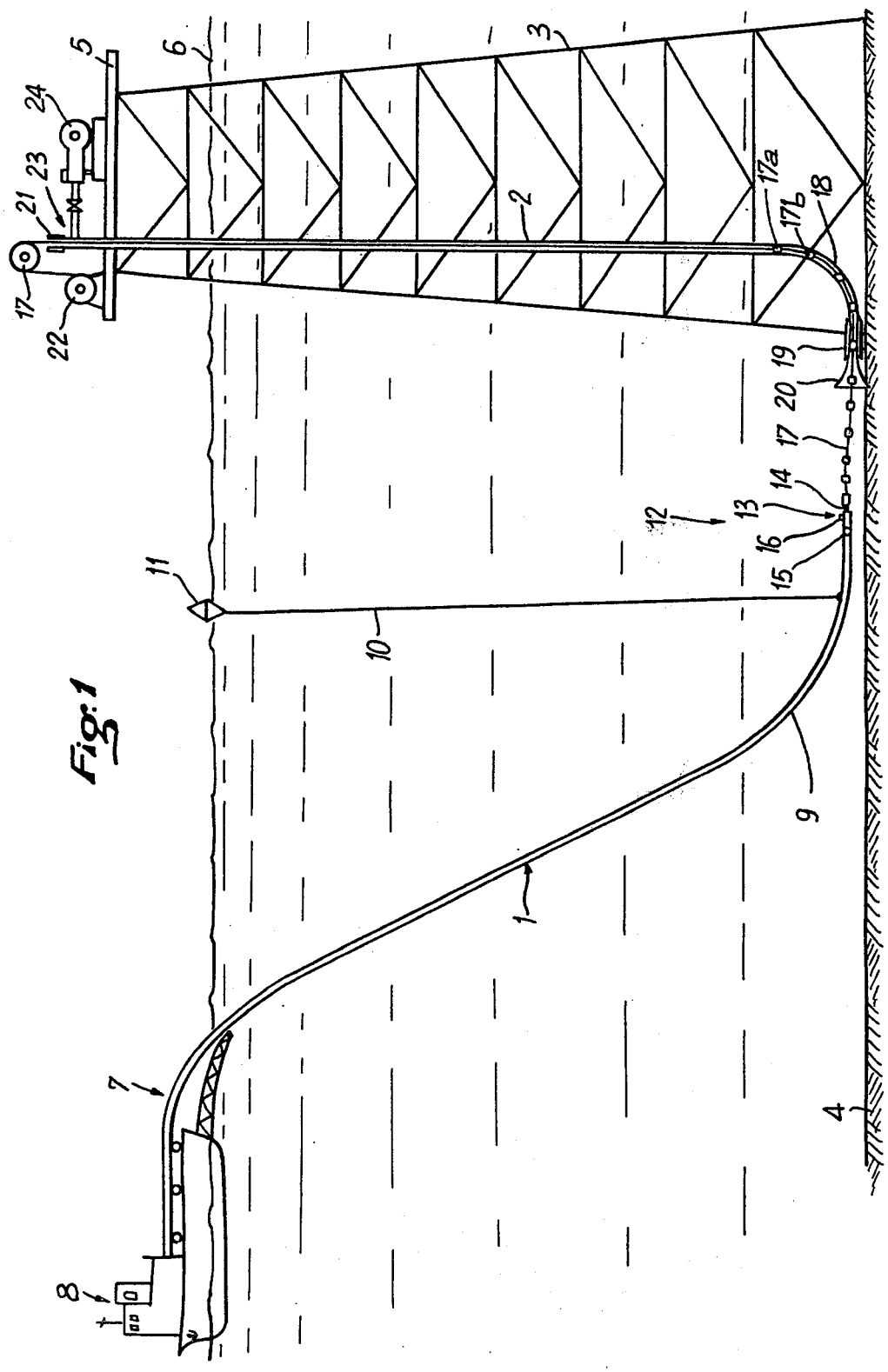

United States Patent [19]

Botrel et al.

[11] 4,342,519

[45] Aug. 3, 1982

[54] CONNECTOR FOR AN END OF AN UNDERWATER PIPE

[75] Inventors: Yvon Botrel, Landorthe; Roland Fremond, Paris; Jean Mourlevat, Roquefort sur Garonne, all of France

[73] Assignee: Societe Nationale Elf Aquitaine (Production), Courbevoie, France

[21] Appl. No.: 132,170

[22] Filed: Mar. 20, 1980

[30] Foreign Application Priority Data

Mar. 2, 1979 [FR] France ................ 79 06938

[51] Int. Cl.³ ................ F16L 1/04
[52] U.S. Cl. ................ 405/169; 138/89; 285/18; 285/342; 285/DIG. 21
[58] Field of Search ........... 405/158, 166, 169, 173; 138/89; 285/18, 24, 27, 96, 342, DIG. 2

[56] References Cited

U.S. PATENT DOCUMENTS

| | | | |
|---|---|---|---|
| 2,536,898 | 1/1951 | Works | 285/96 |
| 3,161,037 | 12/1964 | Lagerquist | 138/89 X |
| 3,482,410 | 12/1969 | Roesky et al. | 405/169 |
| 3,729,941 | 5/1973 | Rochelle | 405/169 |
| 3,846,992 | 11/1974 | Liautaud | 405/169 |
| 3,967,462 | 7/1976 | De Jong | 405/169 |
| 4,184,515 | 1/1980 | Streich et al. | 138/89 |
| 4,209,270 | 6/1980 | Billingsley | 405/169 X |

Primary Examiner—David H. Corbin
Attorney, Agent, or Firm—Brisebois & Kruger

[57] ABSTRACT

A device for connecting two underwater pipes, one prolonged by a terminal and the other by a receptacle for the terminal. The device comprises separate, reversible means for securing and sealing the terminal in the receptacle, and also comprises a tension tool comprising a tension chuck secured to the end of a tension cable, the cable extending through the receptacle and the second pipe, and a plug connected to the chuck by an articulated connecting means having a length variable between a minimum and a maximum greater than the distance between the plug and the opening of the terminal, the chuck and the plug having releasable locking means and sealing means in the terminal. The device is adapted for connecting an underwater pipe to a tubular column, inter alia a production column at the foot of an oil rig.

10 Claims, 4 Drawing Figures

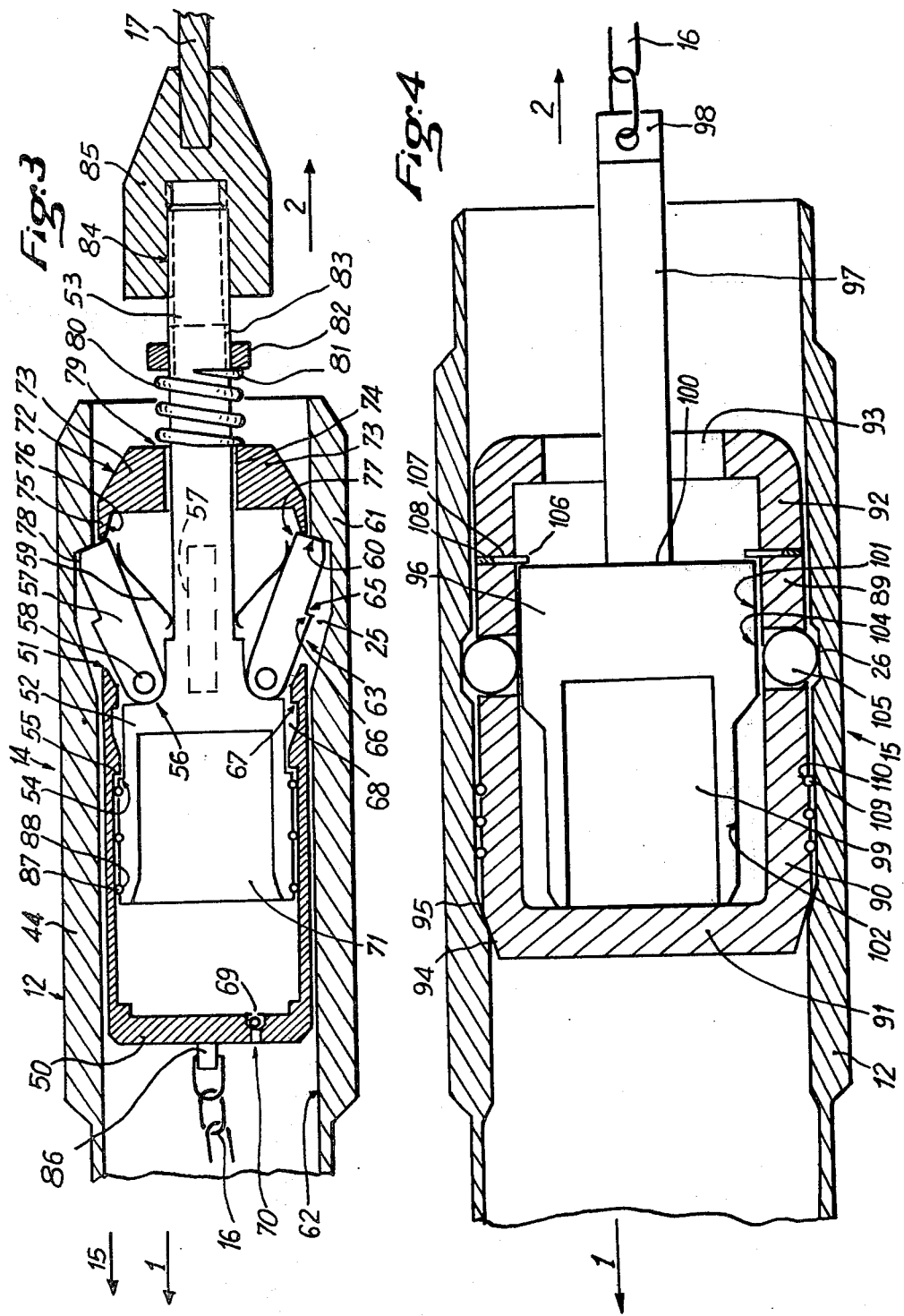

CONNECTOR FOR AN END OF AN UNDERWATER PIPE

The invention relates to a connecting device for an end of an underwater pipe.

In order to connect a pipe at a great depth of water without direct manual intervention, the end of the pipe has to be held under tension during the connection process, sealing-tightness has to be maintained until the connection is made, in order to keep the pipe empty, the connecting and sealing means must be recoverable, and a subsequent disconnection must be made.

The conventional methods of connecting underwater pipes consist either in hyperbaric welds or in using mechanisms which have to be operated by divers.

There are several known connecting means which separately meet one or more of the required conditions.

U.S. Pat. No. 3,308,881—CHAN—describes a device for making connections at a distance between two underwater pipes, wherein the first pipe, prolonged by a guide funnel, is used to convey a tension cable secured to a connecting terminal on the end of the second pipe. The terminal-positioning means are a pair of lateral guides forming a slide, and means for locking the terminal in the funnel are provided. However, the device does not comprise a means for progressively centring the terminal in the funnel, or means for sealing the pipe until and after the connection is made.

French Pat. No. 2 198 599 (U.S. Pat. No. 3,845,973)—Jean J. HOUOT—describes a device for connecting a production column to an underwater pipe and comprising a terminal prolonging the underwater pipe and adapted to be positioned by tension in a receptacle secured by co-operating longitudinal and angular positioning means secured to the terminal and the receptacle respectively, the column and the receptacle being provided with corresponding connecting means which are actuated by vertical motion in translation.

Although the last-mentioned device accurately positions the first terminal in the receptacle, it does not solve the problem of sealing the pipe and of subsequent disconnection.

U.S. Pat. No. 3,982,776—William P. PAYNE—describes a device for connecting a terminal on the end of an underwater pipe to a receptacle prolonging a bend secured to the base of a production column.

Three chucks for positioning, laying and testing the sealing-tightness are successively secured in the terminal, the chucks being attached to the end of a cable extending through the receptacle and the column.

The last-mentioned device does not comprise means for making a subsequent disconnection.

The invention obviates these difficulties by meeting all the required conditions, by using four independent mechanical means, two of which cooperate in insuring sealing-tightness whereas the other two are a locking means and a separate means for positioning under tension.

the device for connecting and disconnecting two underwater pipes has a first pipe prolonged by a terminal in which a laying tool is removably secured and attached to the end of a tension cable, whereas the second pipe is prolonged by a receptacle for the terminal on the first pipe, the receptacle terminating in a convergent guide funnel, and is characterised in that:

the laying tool comprises a tension chuck secured to the end of a tension cable, the cable extending through the receptacle and a second duct, and a plug connected to the chuck by an articulated connecting means having a length variable between a minimum and a maximum greater than the distance between the plug and the opening of the terminal, the chuck and the plug each comprising releasable locking means in the terminal;

the receptacle comprises separate reversible means for securing and sealing the terminal in the receptacle;

the tension cable attached to the laying tool, after extending through the receptacle and the second pipe, is connected to a means for subjecting it to tensile force, the second pipe being connected to a means for subjecting it to a variation in the internal pressure, and the second pipe, whose internal diameter is greater than the external diameter of the laying-tool components, has bends having an internal diameter and radius of curvature such that the laying tool can extend freely inside the assembly forming the second pipe.

In various embodiments, the tension chuck comprises a cylindrical jacket limited towards the first duct by an end whose outer face bears an attachment for a plug-connecting means and also has an orifice and valve, whereas the cylindrical jacket is bounded towards the second pipe by a full-section aperture, the chuck also comprising a piston sliding inside the jacket between an abutment position at the end of the cylindrical jacket and an abutment position against a second annular seat on the internal wall of the jacket, the piston having locking and unlocking means cooperating with an annular groove formed on the internal wall of the terminal, the piston being prolonged opposite the cylinder by a coaxial tension rod secured to the tension cable, the piston co-operating with the internal surface of the cylinder to bound a deformable chamber which can be connected to the external medium by a bore across the end of the cylinder.

In the same embodiments, the means for securing and releasing the chuck in the terminal comprise at least three catches associated with a locking sleeve, one end of each catch being pivoted on the piston by a joint having its axis perpendicular to the piston axis and pressed by the end of a spring strip against the walls of an annular groove formed on the internal surface of the terminal, the other end of the spring being secured to the tension rod of the piston, the coaxial locking sleeve sliding along the piston rod between a "securing" position and a "release" position, the sleeve having an annular skirt whose external surface slides in the terminal and whose internal surface bounds a frusto-conical aperture opening towards the securing catches, the frusto-conical aperture forming a recess for the ends of the catches when, in the release position, the catches are pressed against the piston skirt, whereas in the securing position and during the securing and release operations the annular skirt bears on the ends of the catches and is pressed against them by a coaxial spring which in turn is secured by a securing means to the piston rod; in the release position, the springs of the catches press them against a locking groove formed on the internal wall of the cylinder component of the chuck.

In the same embodiments, the releasable plug is a hollow cylinder comprising means for positioning on a seat, securing means and means for sealing inside the terminal.

Preferably, the means for securing in the terminal comprise an annular securing groove formed on the internal wall of the terminal in association with balls which can move in a straight line across apertures formed in the hollow cylinder wall, between a locking position in which the balls extend into the locking groove in contact with the surface of a piston sliding inside the cylinder, and an unlocking or release position in which the balls are in contact with a skirt prolonging the piston, the skirt having a diameter less than the piston diameter by an amount equal to twice the depth of the locking groove, the piston being prolonged opposite the skirt by a rod ending in a means for securing the tension chuck to a connecting means having a length variable between a minimum and a maximum, the piston when in the locking position being pressed against the end of the cylinder by a brittle washer.

In a preferred embodiment, the connecting means, having a length variable between a minimum and a maximum, between the plug and the chuck is a metal chain.

In the various embodiments, the reversible securing means associated with the receptacle on the second pipe are of the mechanical locking type driven by a hydraulic motor via an endless screw co-operating with a helical wheel, the wheel being formed on a screw driving a securing nut reversibly in a straight line, the nut being prevented from rotation by a sliding key, the nut moving an annular securing segment from a release position to a locking position and vice versa.

In the same embodiments, the reversible sealing means in the receptacle on the second pipe are of the mechanical locking kind driven by a hydraulic motor via an inlet screw co-operating with a helical wheel, the wheel being formed on a screw driving a locking nut reversibly in a straight line, the nut being prevented from rotation by a sliding key, the nut moving a sealing packing from a non-sealing position to a sealing position and vice versa.

In a preferred embodiment, the sealing means in the receptacle on the second pipe also comprise a duct formed through the receptacle and connected to a means for injecting a sealing paste into the recess in the sealing packing.

In one application, the second pipe is a production column secured to a structure resting on the sea bed and emerging above the sea.

Figure 2:
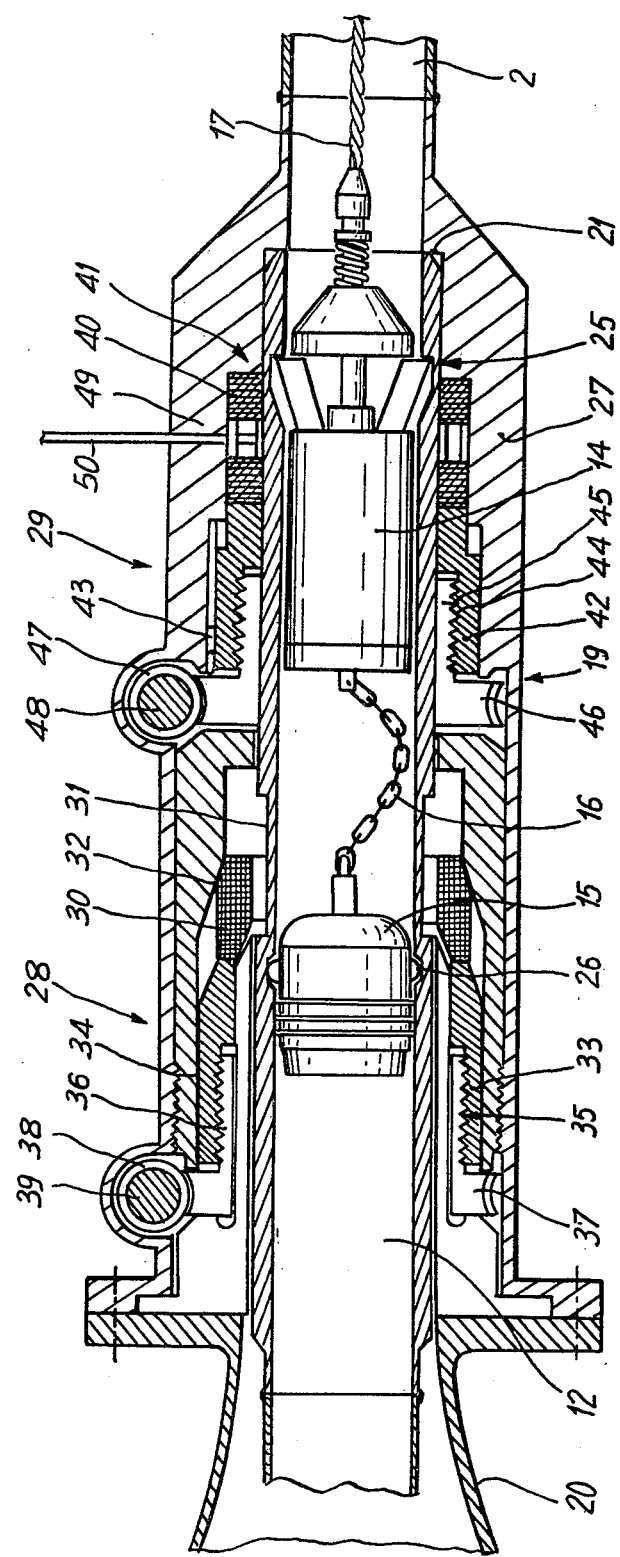

The invention will be more clearly understood from the following non-limitative description of an embodiment according to the invention, illustrated by means of the accompanying drawings:

FIG. 1: block diagram of an installation for connecting an underwater pipe to a production column at the foot of an oil rig;

FIG. 2: block diagram of the connector;

FIG. 3: releasable tension chuck;

FIG. 4: releasable plug.

FIG. 1 is a block diagram of an installation for connecting an underwater pipe or first pipe 1 to a second pipe 2 or production column secured to a support such as a metal structure 3 resting on an underwater bed 4 and bearing a rig 5 above the sea level 6.

Pipe 1 is represented at the beginning of the laying operation.

One end thereof 7 is borne by a laying barge 8 and the other end 9 rests on the sea bed. A cable 10 connects end 9 to a float 11 so as to mark its position. End 9 has a terminal 12 which removably contains a tension device 13 comprising a releasable tension chuck 14 and a releasable plug 15 connected by an articulated, variable-length connecting means such as a chain 16. The connecting device 13 is secured to the end of a tension cable 17.

The production column 2 is substantially rectilinear and vertical between rig 5 and near the sea bed 4, where it is secured via a bend 18 to a receptacle 19, the axis of which is substantially horizontal, continued by a guide funnel 20.

The various components of the tension device 13 have outer diameters less than the internal diameter of receptacle 17 and pipe 2.

Bend 18 has an internal diameter and a radius of curvature such that the tension device 13, allowing for the dimensions of its constituent elements, can move in the space in the bend and subsequently in pipe 2.

The tension cable 17 to which the tension device 13 is secured has centring means 17a, 17b and extends in succession inside funnel 20, receptacle 19 and production column 2. Subsequently, at the level of rig 5, it emerges from column 2 via a packing-box 21 and its end is secured to the drum of a winch 22 under constant tension. Above packing-box 21, column 2 is releasably secured by a pipe 23 to a pumping means 24.

FIG. 2 is a blook diagram of a tension means 13 secured to a tension table 17. The tension means 13 comprises a releasable tension chuck 14 and a releasable plug 15, the two being connected by a chain 16.

The tension means 13 is removably disposed in a terminal 12 prolonging the first pipe 1. The internal surface of terminal 12 has a groove 25 for securing chuck 14 and a groove 26 for securing plug 15, the two grooves being spaced apart by a distance such that when the chuck and plug are secured, the length of chain 16 is greater than the distance betweeen the end of terminal 12 and the place where plug 15 is attached when secured in the terminal.

FIG. 2 shows the connecting installation at the end of the connection process, when the chuck is still secured in terminal 12. Terminal 12 is in the connection position in receptacle 19, prolonged by the guide funnel 12.

Receptacle 19 prolongs column 2 and is connected thereto by an internal reduction in diameter, the reduction forming an annular seat 21 which abuts the end of terminal 12.

Receptacle 19 comprises a tubular vessel 27 prolonging column 2 and prolonged by funnel 20 and containing a means 28 for securing terminal 12 in receptacle 19 and a means 29 for sealing terminal 12 in receptacle 19.

The securing means 28 comprises a deformable annular segment 30 of spring steel formed with a radial slot (not shown) sufficiently thick to allow variations in the internal diameter of the segment such that the segment is deformed between an unlocking position in which the internal diameter is greater than the external diameter of terminal 12 and a locking position in which the internal diameter is less than the external diameter of terminal 12, when the internal surface of the segment bears on the surface of an annular securing groove 31 formed on the external surface of terminal 12.

The resilient segment 30 bears at one end on a frusto-conical surface 32 formed on the internal surface of chamber 27, surface 32 being convergent in the inlet direction towards colmn 2.

The other end of segment 30 bears on a flat annular end surface of a securing nut 33 guided in translation by a key 34. Nut 33 has a screwthread 35 engaging a sleeve 36 having an outer surface which is screw-threaded with the same pitch as screw 35. Sleeve 36 comprises a driving means such as a helical gear-wheel 37 engaging an endless screw 38 driven by a hydraulic motor (not shown) secured to the end of a shaft 39 connected to the surface by a supply pipe (not shown).

The sealing means 29, which comprises an annular elastomeric packing 40, bears at one end on an annular seat 41 formed on the internal surface of chamber 27, the annular seat constituting an internal reduction in the diameter of chamber 27 in the direction of column 2. The other end of packing 40 bears on the flat annular end surface of a sliding sealing-tight nut 42 guided in translation by a key 43. Nut 42 has a screwthread 44 engaging a similarly threaded sleeve 45. Sleeve 45 has drive means such as a helical gear-wheel 46 engaging an endless screw 47 driven by a hydraulic motor (not shown) secured to the end of a shaft 48, the motor being connected to the surface by a supply pipe (not shown). At the central plane of the annular packing 40, a bore 49 across chamber 27 is connected by a supply duct 50 to the surface by a means (not shown) for injecting a non-polymerizable non-drying paste for sealing.

The annular packing 40 has at least one radial bore for conveying the sealing paste between its outer surface and its internal surface in contact with terminal 12.

FIG. 3 is a diagram of a releasable tension chuck 14 in the locked position in a terminal 12.

The chuck has a cylindrical sleeve 44, the outer diameter of which is slightly less than the internal diameter of terminal 12, the cylindrical jacket 44 being limited upstream, i.e. towards pipe 1, by a hermetically sealed solid end 50, and limited downstream, i.e. towards column 2, by a circular aperture 51, forming the cross-section of a cylinder. A piston 52 prolonged downstream by a coaxial rod 53 can move in cylindrical jacket 44 in translation between an unlocking or release position, in which piston 52 abuts the downstream end 50, and a locking position, in which an external reduction in diameter of the piston, forming an annular surface 54, rests against a thickened annular seat 55 on the internal wall of the The downstream face 56 of piston 52 has a number of securing catches 57 regularly spaced around the axial rod, each catch being pivoted to a shaft 58 perpendicular to the piston rod and secured thereto. The catches are plates having a centre plane extending through the piston rod 53 and having a substantially rectangular surface, the surface being longer than it is wide and perforated near one end to receive shaft 58.

Each catch 57 has a return spring 59 comprising a steel strip which can bear and move on the axial rod 53. Each catch 57 can rotate around its axis 58 from a "chuck-release" position, in which the catches extend substantially parallel to the piston-rod and exert a return stress on springs 59 and bear against the internal wall of the cylinder, to a "chuck locking" position in which catches 57 are at an angle of about 30° to the piston rod and extend out of the outer surface of the cylinder beyond the circular aperture 51. In that case, the end 60 of each catch 57 bears on an annular portion 61 comprising the upstream wall of an annular groove 25 formed in the internal wall 67 of the tension terminal. The annular surface 61 forms a frusto-conical surface having an apex angle slightly less than 180°, e.g. 140°, whereas the downstream wall 63 of groove 25 is a frusto-conical surface having a smaller apex angle, e.g. 40°.

The edge 64 of each catch 57 remote from the piston rod has an angular notch, slot or the like 65 forming a right angle and having a downstream surface 66 substantially perpendicular to the longitudinal dimension of the catch. Face 65 forms a surface which, when the piston is in the position for releasing the tension chuck, bears on an annular surface 67, the wall of a groove 68 formed on the internal wall of the cylinder. Groove 68, in co-operation with the catches, constitutes a pawl and ratchet mechanism for securing the piston in the cylinder in the chuck-release position.

End 50 is formed with an orifice 69 from which an inflating valve 70 is secured.

The upstream face of piston 52 has a cylindrical cavity 71 equal to the minimum volume allocated to the space between piston 52 and the upstream end 50, in the chuck release position.

A locking sleeve 72 is mounted on rod 53 and slides along it. Sleeve 72 comprises a disc 73 formed with a coaxial cylindrical orifice 74 having a diameter slightly greater than the diameter of rod 53. Disc 73 has a skirt secured to the outer surface of its upstream face, the diameter of the cylindrical external face of the skirt being the same as the outer diameter of cylinder 44, whereas the internal face of the skirt has a frusto-conical shape 76 open in the upstream direction.

In the upstream direction, sleeve 72 bears on the ends of catches 57. In the chuck locking position, the end surface 77 of skirt 75, i.e. a flat annular surface, bears on the end surface of catch 57 which, in the corresponding position, partly bears on the annular surface 61. In the chuck release or unlocking position, the frusto-conical internal face 76 of the sleeve is in contact with the bevelled surfaces 78 in the external corner of each catch, and the end of the catch bears against the upstream face of disc 73.

In the downstream direction, sleeve 72 bears on one end 79 of a helical spring 80 surrounding the piston rod, the other end 81 of the spring abutting a nut 82 secured on a screw thread 83 formed on the surface of rod 53, the nut being movable along the screwthread.

A shoe 85 for securing the end of the operating cable 17 is secured by a screwthread 84 to the downstream end of rod 53.

A device 86 for attaching the end of a chain 16 to an upstream releasable plug 15 is secured to the front end face 50 of cylinder 44.

The outer surface of piston 52 has at least one sealing packing 87 which partly fits into a groove 88 formed on the aforementioned outer surface of piston 52. The packings 82 are elastomeric O rings.

FIG. 4 is a diagram of a releasable plug 15 in the locking position in a tension terminal 12.

A releasable plug 15 of the aforementioned kind comprises a receptacle 89, i.e. a cylindrical jacket 90 having an external diameter slightly less than the diameter of terminal 12, a hermetically sealed end 91 secured to the front surface of jecket 90, i.e. towards pipe 1, and a cap 92 secured to the downstream end of jacket 90, i.e. towards pipe 2. Cap 92 is perforated by a coaxial aperture 91.

At its upstream end jacket 90 has a frusto-conical surface 94 bearing on a frusto-conical seat 95 formed on a thick portion inside terminal 12, portion 94 associated with seat 95 forming a means for positioning the plug in terminal 12.

In jacket 90, a piston 96 can move in translation between a "plug-locking" position inside terminal 12 in which piston 96 abuts the upstream end 91 of cylinder 89, and a "unlocking" or "release" position in which the piston abuts cap 92.

Piston 96 is prolonged downstream by an axial rod 97 having a diameter less than the coaxial aperture 93 of cap 92 and ending in a device 98 for securing chain 16.

Piston 96 has a cylindrical cavity 99 opening on to its upstream face. Cavity 99 reduces the weight of piston 96. Piston 96, which forms a securing sleeve, has an outer surface divided into two parts, i.e. a first portion 101 extending from the point of attachment 100 of rod 97 and having a diameter slightly less than the internal diameter of jacket 90, and a second portion or skirt 102 having a diameter less than the diameter of the preceding portion by an amount slightly greater than twice the depth of the securing groove 26 on the internal surface of terminal 12.

Portions 101 and 102 are connected by an annular frusto-conical surface 103. The length of the two portions and the connecting surface are such that, in the position when the releasable plug 15 is secured in terminal 12, the end of the piston skirt 102 bears on end 91 and the cylindrical part 101 blocks a number of circular apertures 104 regularly distributed in an annular region formed on jacket 90. Apertures 104 have a diameter slightly greater than the balls 105 which they contain, the diameter being equal to the thickness of jacket 90 plus the depth of groove 26.

When the releasable plug 15 is in the locked position in terminal 12, piston 96 is held by a brittle locking washer 106 in the position where the end of skirt 102 bears on end 91. Washer 106 is disposed in a groove 107 between jacket 90 and cap 92 level with embedded screws 108 for releasably securing cap 92 to jacket 90.

On the outer surface of jacket 90, the releasable plug 15 has at least one sealing packing 109, partly received in a groove 110 formed on the aforementioned outer surface of jacket 90. Packings 109 are elastomeric O rings.

Operation of the Connector

Rig 5 secured to structure 3 is anchored and secured to the sea bed after being equipped with a column 2 complete with bend 18, receptacle 19 and funnel 20, receptacle 19 being provided with securing means 28 and sealing means 29 and associated hydraulic motors and supply ducts ending at the rig, and also equipped with an operating cable 17 guided by centring means 17a, 17b, ... in column 2 before the rig is anchored. One end of the cable is secured to the drum of a constant-tension winch 22 and the other end rises from funnel 20 to the deck of rig 5 where it is held ready for pulling on board a laying barge 8.

The operations preliminary to laying the underwater pipe are performed on the laying barge 8 and comprise the following in succession:

The tension terminal 12 is welded to the end of pipe 1;

The releasable plug 15 is positioned on its seat and secured by pressure on piston rod 97;

Washer 106 is positioned and cap 92 is secured;

The interior of chuck 14 is inflated by valve 70, using nitrogen at a pressure above the immersion pressure;

Chain 16 is connected to the tension chuck 14;

Chuck 14 is positioned and secured in terminal 12;

The free end of tension cable 17 is placed on barge 8 and connected to the end of rod 53 prolonging chuck 14, by an anchoring shoe 85 crimped to cable 17.

Pipe 1 is then laid. The end of pipe 1 is equipped with position-finding means such as a float 11, to which it is connected by a cable or a buoy rope 10.

A number of means (not shown in FIG. 1) can be used in conventional manner in this method of anchoring a pipe at sea.

When a sufficient length of pipe has been laid, pipe 1 is towed along the bottom from the oil-rig winch, in co-ordination with the barge, until the tension terminal 12 completely engages in receptacle 19.

The operation is monitored by under-water television cameras.

Next, the terminal is anchored in the receptacle by rotating the hydraulic motor 39 by means of the supply duct connecting motor 39 to the rig. The hydraulic motor 39 is started, whereupon the nut 33, guided by key 34, moves and pushes the resilient segment 30, which deforms on the frusto-conical slope 32 of the connector and abuts the groove 31 machined in the tension terminal.

Next, the terminal is sealed in the receptacle by driving motor 48 in rotation, by means of the supply duct connecting it to the rig. When motor 48 rotates, it moves a sealing nut 42 which, guided by a key 43, moves and compresses packings 40.

Sealing-tightness is maintained by seals or packings of elastomer compressed by screwing. Additional sealing-tightness can be provided by injecting a special paste under pressure through a supply duct 50.

The clamping torques, both for securing and for sealing-tightness, are evaluated on the basis of the pressure of the oil supplying the hydraulic motors, which will be found experimentally.

The hydraulic motors and supply ducts may without disadvantage be left in position, so that they can be disconnected if required.

Finally, the tension device 13 is relaxed and recovered by the following operations:

The tension on the operating table is relaxed, and

Column 2 is pressurized by pump 24 until the pressure is greater than the inflation pressure minus the hydrostatic immersion pressure.

The pressure in the cavity inside the chuck 14 becomes less than the external pressure, and piston 52 moves upstream until it bounds a space such that the internal pressure is again in equilibrium with the external pressure. The locking lugs 57 bend so as to cease their locking action. Under the action of spring 80, sleeve 72 covers the ends of the lugs.

Tension is exerted on cable 17, thus moving the chucks, stretching chain 16 and consequently tearing washer 106, moving piston 96, releasing balls 105 and consequently releasing plug 15 from terminal 12.

Tension exerted on cable 17 moves the chuck, stretches chain 16 and releases plug 15 from the terminal.

The chuck and plug do not have any other rough surfaces which can cause jamming, and consequently the two components of the connector can be raised by cable 17.

Disconnection of the Pipes

The previously-described device, the operation of which has been described, has the advantage of allowing the underwater pipe to be disconnected.

Before the disconnection operation, a releasable plug can be placed in terminal 12, using seat 95 and groove 26, by means of a metal wire or operating cable (English term: "wire line"). The equipment and methods of operation are prior art.

The securing means 28 and sealing means 29 are disposed so that hydraulic motors 39 and 48 can be driven in rotation in the opposite direction from that used for connecting the pipes. In such cases, the packing 40 has characteristics such that it can resiliently return to its shape when disconnected.

As a result of tension exerted on pipe 1, terminal 12 comes out of receptacle 19 and the parts are disconnected.

Inspection and Safety

Since the previously-described mechanical means are made up of components having simple shapes and adapted to one another, the entire device is very simple to assemble and use.

Furthermore, the system is such that independent mechanical means are used for performing the four operations required for connecting the pipes and positioning the locking means on the two components of the connector. It is thus possible during operation to check the sealing-tightness immediately before beginning the work of releasing the tension and withdrawing the connector.

If, during the pressurizing of pipe 2 by pump 24, a perturbation corresponding to a leak is observed, the operation is stopped and oil pressure is applied to motor 48 so as to strengthen the sealing-tightness between the terminal and the receptacle.

If the perturbation in pressure is still measurable, checks are made by measurements on the laying ship to see if the leak is occurring at plug 15. If this is the case, the connecting operation can be continued.

If plug 15 is found to be sealing-tight, the leak will be between the terminal and the receptacle, which will have to be disconnected for checking.

These inspection means ensure reliable operation of the connection means according to the invention, with all the desired safety.

We claim:

1. Arrangement for connecting and disconnecting two underwater pipes comprising
   a first pipe,
   a terminal secured to an end of the first pipe,
   a laying tool within and releasably secured to the terminal, said laying tool being attached to the end of a tension cable,
   a second pipe,
   a receptacle secured to an end of the second pipe,
   a guide funnel at the end of the receptacle and converging toward the receptacle,
   said laying tool comprising a tension chuck and a sealing plug connected together by an articulated connector,
   cooperating means on said chuck and terminal including locking means on said chuck, for releasably locking said chuck within said terminal against separation from the terminal upon application of a pulling force exerted by the tension cable,
   plug lock means on said plug for releasably securing said plug in said terminal behind said chuck to seal the terminal end of said first pipe,
   said tension cable being adapted to be thread through said second pipe to pull said terminal into said funnel and then into said receptacle in response to a pull exerted on said tension cable,
   reversible means on said receptacle for securing said terminal in said receptacle,
   reversible means on said receptacle for sealing said terminal in said receptacle,
   axially moveable means on said chuck, moveable between a first position in which said locking means lock said chuck in said terminal and a second position in which said locking means are withdrawn and unlocked from said terminal, in response to pressure applied in said second pipe, and means on said chuck for retaining said locking means in said unlocked position during pulling of the chuck through the second pipe by said tension cable,
   and means on said plug for releasing said plug in response to a pull exerted thereon by said articulated connector during pulling of the chuck by the cable after release of the chuck from the terminal, said connector pulling said plug through the second pipe behind the pipe.

2. A device according to claim 1, wherein the tension chuck comprises a cylindrical jacket limited towards the first duct by an end whose outer face bears an attachment for a plug-connecting means and also has an orifice and valve, whereas the cylindrical jacket is bounded towards the second pipe by a full-section aperture, the chuck also comprising a piston sliding inside the jacket between an abutment position at the end of the cylindrical jacket and an abutment position against a second annular seat on the internal wall of the jacket, the piston having locking and unlocking means cooperating with an annular groove formed on the internal wall of the terminal, the piston being prolonged opposite the cylinder by a coaxial tension rod secured to the tension cable, the piston cooperating with the internal surface of the cylinder to bound a deformable chamber which can be connected to the external medium by a bore across the end of the cylinder.

3. A device according to claim 2, wherein the means for securing and releasing the chuck in the terminal comprise at least three catches associated with a locking sleeve, one end of each catch being pivoted on the piston by a joint having its axis perpendicular to the piston axis and pressed by the end of a spring strip against the walls of an annular groove formed on the internal surface of the terminal, the other end of the spring being secured to the tension rod of the piston, the coaxial locking sleeve sliding along the piston rod between a "securing" position and a "release" position, the sleeve having an annular skirt whose external surface slides in the terminal and whose internal surface bounds a frusto-conical aperture opening towards the securing catches, the frusto-conical aperture forming a recess for the ends of the catches when, in the release position, the catches are pressed against the piston skirt, whereas in the securing position and during the securing and release operations the annular skirt bears on the ends of the catches and is pressed against them by a coaxial spring which in turn is secured by a securing means to the piston rod; in the release position, the springs of the catches press them against a locking groove formed on the internal wall of the cylinder component of the chuck.

4. A device according to claim 1, wherein the plug is a hollow cylinder comprising means for positioning on a seat, securing means and means for sealing inside the terminal.

5. A device according to claim 4, wherein the means for securing in the terminal comprise an annular securing groove formed on the internal wall of the terminal in association with balls which can move in a straight line across apertures formed in the hollow cylinder wall, between a locking position in which the balls extend into the locking groove in contact with the surface of a piston sliding inside the cylinder, and an unlocking or release position in which the balls are in contact with a skirt prolonging the piston, the skirt having a diameter less than the piston diameter by an amount equal to twice the depth of the locking groove, the piston being prolonged opposite the skirt by a rod ending in a means for securing the tension chuck to a connecting means having a length variable between a minimum and a maximum, the piston when in the locking position being pressed against the end of the cylinder by a brittle washer.

6. A device according to claim 1, wherein the connecting means, having a length variable between a minimum and a maximum, between the plug and the chuck is a metal chain.

7. A device according to claim 1, wherein the reversible securing means associated with the receptacle on the second pipe are of the mechanical locking type driven by a hydraulic motor via an endless screw co-operating with a helical wheel, the wheel being formed on a screw driving a securing nut reversibly in a straight line, the nut being prevented from rotation by a sliding key, the nut moving an annular securing segment from a release position to a locking position and vice versa.

8. A device according to claim 1, wherein the reversible sealing means in the receptacle on the second pipe are of the mechanical locking kind driven by a hydraulic motor via an inlet screw co-operating with a helical wheel, the wheel being formed on a screw driving a locking nut reversibly in a straight line, the nut being prevented from rotation by a sliding key, the nut moving a sealing packing from a non-sealing position to a sealing position and vice versa.

9. A device according to claim 1, wherein the sealing means in the receptacle on the second pipe also comprise a duct formed through the receptacle and connected to a means for injecting a sealing paste into the recess in the sealing packing.

10. A device according to claim 1, wherein the second pipe is a production column secured to a structure resting on the sea bed and emerging above the sea.

* * * * *